US012589543B2

(12) United States Patent (10) Patent No.: US 12,589,543 B2
Sauter et al. (45) Date of Patent: Mar. 31, 2026

(54) METHOD FOR PRODUCING A CONTAINER PRODUCT AND DEVICE FOR IMPLEMENTING THE METHOD

(71) Applicant: KOCHER-PLASTIK MASCHINENBAU GMBH, Sulzbach-Laufen (DE)

(72) Inventors: Roland Sauter, Sulzbach-Laufen (DE); Alexander Muff, Buttisholz (CH); Michael Schultes, Fichtenau (DE); Frank Mark, Spiegelberg (DE); Tobias Dorsch, Obersontheim (DE); Lasse Fries, Aalen (DE); Thomas Höglinger, Obersontheim (DE); Helmut Jacob, Ettlingen (DE); Patryk Prezyna, Fellbach (DE); Harald Reichart, Gaildorf (DE); Roland Speiser, Abtsgmünd (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 155 days.

(21) Appl. No.: 17/915,629

(22) PCT Filed: Mar. 1, 2021

(86) PCT No.: PCT/EP2021/055052

§ 371 (c)(1),
(2) Date: Sep. 29, 2022

(87) PCT Pub. No.: WO2021/197737

PCT Pub. Date: Nov. 7, 2021

(65) Prior Publication Data

US 2023/0145486 A1     May 11, 2023

(30) Foreign Application Priority Data

Apr. 1, 2020     (DE) ..................... 10 2020 002 077.1

(51) Int. Cl.
      B29C 49/42          (2006.01)
      B29C 49/04          (2006.01)
      (Continued)

(52) U.S. Cl.
      CPC .... B29C 49/04102 (2022.05); B29C 49/0411 (2022.05); B29C 49/42067 (2022.05);
      (Continued)

(58) Field of Classification Search
      CPC .......... B29C 49/42067; B29C 49/4817; B29C 49/42422; B29C 49/76; B29C 49/42071;
      (Continued)

(56) References Cited

U.S. PATENT DOCUMENTS 2,783,503 A     3/1957   Sherman
4,153,408 A     5/1979   Albert et al.
      (Continued)

FOREIGN PATENT DOCUMENTS

DE          1 136 095          9/1962
DE          1 163 000          2/1964
      (Continued)

OTHER PUBLICATIONS

International Search Report (ISR) issued May 11, 2021 in International (PCT) Application No. PCT/EP2021/055052.

*Primary Examiner* — Monica A Huson
(74) *Attorney, Agent, or Firm* — Wenderoth, Lind & Ponack, L.L.P.

(57) ABSTRACT

A method for producing at least one molded, filled and sealed container product (10) includes at least the method steps of: extruding a hose (32) by an extrusion device (12) using supporting gas in vertical extrusion direction in a preforming position; sealing the hose (32) at its lower end and cutting it at its upper open end; cutting the parison (22) to length; transporting the cut parison by a gripper device (Continued)

(20) in linear transport direction transverse to the extrusion direction from the preforming position into an opened molding tool (18); transferring the parison (22) into the opened molding tool (18) by the gripper device (20) in a main forming position; sealing the molding tool (18) for further forming of the parison (22) by a pressure gradient; filling and sealing the parison (22); and returning the gripper device (20) to the preforming position for a repeated sequence of the above method steps.

23 Claims, 10 Drawing Sheets

(51) Int. Cl.

| | |
|---|---|
| *B29C 49/56* | (2006.01) |
| *B29C 49/76* | (2006.01) |
| *B29C 49/78* | (2006.01) |
| *B67C 3/22* | (2006.01) |
| *B67C 7/00* | (2006.01) |
| *B29C 49/48* | (2006.01) |
| *B29K 23/00* | (2006.01) |
| *B29L 31/00* | (2006.01) |

(52) U.S. Cl.
CPC .. *B29C 49/42071* (2022.05); *B29C 49/42073* (2022.05); *B29C 49/42075* (2022.05); *B29C 49/42079* (2022.05); *B29C 49/42093* (2022.05); *B29C 49/42422* (2022.05); *B29C 49/4252* (2013.01); *B29C 49/5605* (2022.05); *B29C 49/76* (2013.01); *B29C 49/786* (2013.01); *B67C 3/22* (2013.01); *B67C 7/00* (2013.01); *B29C 2049/4887* (2013.01); *B29C 2793/0027* (2013.01); *B29C 2793/0081* (2013.01); *B29K 2023/00* (2013.01); *B29K 2995/0039* (2013.01); *B29K 2995/004* (2013.01); *B29L 2031/7158* (2013.01); *B67C 2003/227* (2013.01)

(58) Field of Classification Search
CPC ........ B29C 49/42079; B29C 49/42075; B29C 49/786; B29C 49/04; B29C 49/4205; B29C 49/4252; B29C 49/42808; B29C 2049/7878; B29C 2049/2026; B29C 49/42073; B29C 49/06916; B29C 2793/0081; B29C 49/42418; B29C 2793/0027; B29C 2049/2008; B29C 49/42802; B29C 2049/78745; B29C 49/42414; B29C 2049/2047; B29C 49/56; B29C 49/04102; B29C 49/4242; B29C 2049/7871; B29C 2049/7875; B29C 2049/4887; B29C 2049/7861; B67C 7/00; B67C 3/22; B67C 2003/227; B29K 2023/00; B29K 2995/0039; B29K 2995/004; B29L 2031/753; B29L 2031/7158

See application file for complete search history.

(56) References Cited

U.S. PATENT DOCUMENTS

| | | | |
|---|---|---|---|
| 4,596,110 | A | 6/1986 | Weiler |
| 4,699,748 | A * | 10/1987 | Weiler .................. B29C 66/542 |
| | | | 264/249 |
| 7,192,549 | B2 | 3/2007 | Hansen |
| 7,309,463 | B2 | 12/2007 | Hansen |
| 7,357,893 | B2 | 4/2008 | Hansen et al. |
| 10,464,708 | B2 | 11/2019 | Geser et al. |
| 2004/0065983 | A1 | 4/2004 | Hansen et al. |
| 2005/0156360 | A1 | 7/2005 | Hansen |
| 2007/0187877 | A1 | 8/2007 | Hansen |
| 2008/0258334 | A1 | 10/2008 | Hansen |
| 2009/0324866 | A1 * | 12/2009 | Bocker ............... B29C 49/2408 |
| | | | 264/529 |
| 2017/0113829 | A1 | 4/2017 | Geser et al. |
| 2017/0173842 | A1 | 6/2017 | Hirota et al. |

FOREIGN PATENT DOCUMENTS

| | | |
|---|---|---|
| DE | 32 31 859 | 4/1983 |
| DE | 102 45 318 | 4/2004 |
| DE | 103 47 908 | 5/2005 |
| DE | 10 2014 008 611 | 12/2015 |
| WO | 02/49821 | 6/2022 |

* cited by examiner

METHOD FOR PRODUCING A CONTAINER PRODUCT AND DEVICE FOR IMPLEMENTING THE METHOD

FIELD OF THE INVENTION

The invention relates to a method for producing at least one molded, filled and sealed container product, for example, bottles or ampoules, and to a device for implementing the method.

BACKGROUND OF THE INVENTION

WO 02/49821 A2 discloses a method for blow molding, filling and sealing containers, such as ampoules, in which at least one hose of plasticized plastic material is extruded into an open mold. Sealing the mold welds the hose at its leading end. In addition, a separating element is used to cut the hose above the mold to form a filling opening. The mold with the hose section inside is then moved to a filling position, where the container is filled after it has been formed in the mold by generating a pressure gradient acting on the hose and expanding it. After filling, the container is sealed while still in the mold. In addition, a corresponding device is disclosed.

SUMMARY OF THE INVENTION

The invention addresses the problem of further improving the known blow molding, filling and sealing process in terms of its efficiency.

A method for producing at least one molded, filled and sealed container product according to the invention solves that problem.

The method according to the invention is characterized by at least the method steps outlined below:

extruding a hose by an extrusion device using supporting gas in the vertical extrusion direction in a preforming position, sealing the hose at its lower end and cutting it off at its upper open end, transporting such a parison cut to length using a gripper device in a linear transport direction transverse to the extrusion direction from the preforming position into an open molding tool, transferring the parison into the opened molding tool using the gripper device in a main forming position, sealing the molding tool for the purpose of further forming the parison using a pressure gradient, filling and sealing the parison, and returning the gripper device to the preforming position for a repeated sequence of the method steps listed above.

The hose is extruded in a heat-softened state, wherein the term "heat-softened" shall be defined to denote a plasticized state of a thermoplastic, in which forming by a pressure gradient and/or welding is possible without supplying additional heat. Heat-softened parisons typically have an average temperature of 150° C. to 210° C., depending on the plastic material.

Suitable plastics for the method according to the invention are semi-crystalline polyolefins, such as polyethylene (PE), in particular low-density polyethylene (PE-LD), high-density polyethylene (PE-HD) and polypropylene (PP). Advantageously, amorphous polyolefins such as cycloolefin polymers (COP) and cycloolefin copolymers (COC) can also be processed according to the invention. The method according to the invention can also be used to produce multilayer containers—as described in DE 10 347 908 A1.

In contrast to the method known from the prior art, based on the stationary arrangement of the molding tool, the molding tool does not have to be moved from the extrusion device to the molding-filling-sealing station, hereinafter also referred to as the sealing station, and vice versa during every process run. This not only eliminates the need to move the molding tool, which can be very heavy if several cavities are provided for the production of one container product each, but also facilitates the precise alignment of the mold halves of the stationary molding tool with each other for the production of the container product. In addition, owing to the stationary arrangement of the molding tool according to the invention, its ports, for instance in the form of a power supply, a cooling medium supply and/or a compressed air supply, do not have to be moved along during motions of the molding tool from the extrusion device to the sealing station and vice versa. This arrangement reduces the amount of energy required to perform the method, rendering it simple and inexpensive to perform.

Furthermore, due to the hose being sealed at its lower end by applying a closing force by the gripper device, which is separate from the molding tool, the closing force of the molding tool for welding in this area is lower than the closing force of the gripper device.

Because the heat-softened parison is not extruded directly into an open mold, but is held by the gripper device and moved from the preforming position to the main mold position, the parison is largely freely accessible for further additional method steps before it is transferred to the molding tool. In that way, already in the preforming position the outer diameter of the heat-softened hose can be limited by a shaping tool, such as a calibrating element, which is positioned around the heat-softened hose before it is cut off. The use of a calibration element has proved particularly useful for thin-walled parisons, i.e. parisons having an average wall thickness of less than approximately 0.2 cm. Furthermore, to improve the properties of the parison, in particular for a targeted modification of its surfaces, the inner surface and/or outer surface of the parison can be treated using a fluid, for instance, to flush it with sterile air or an inert gas for medical purposes. Furthermore, the temperature of all or part of the parison can be controlled using cooling, heating, shielding and/or reflecting devices or based on motion time or speed controlled by a control device. In addition, a test of deviations from the predefinable target of an extruded parison, for instance with regard to dimensions, weight, temperature, transparency and/or particle inclusions, can be performed particularly easily and inexpensively, so that the extrusion process can be controlled just as easily and inexpensively based on a corresponding test. As a result, the method can be performed particularly efficiently. This ability is without parallel in the prior art.

Particularly in the case of parisons of low weight and/or low volume, during rapid motions one would expect deformations, spatial deflections and/or agglutinations when several parisons being transported simultaneously. Surprisingly, it turned out that even parisons weighing less than approximately 0.07 kg and/or having a volume of less than 500 ml can be moved without any problems using the gripper device when the heat-softened parison is held at two points. In this case, it has also surprisingly turned out that no significant inhomogeneous thickening or bead formation of the parison, which would actually be expected, occurs during transport if the transport time in the gripper device is less than approximately two to three seconds.

The invention also addresses a device for implementing a method described above, comprising at least the components listed below: extrusion device, gripper device and molding tool.

Further features of the method and device according to the invention are disclosed.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are in general view and not to scale.

DETAILED DESCRIPTION OF THE INVENTION

Figure 1:
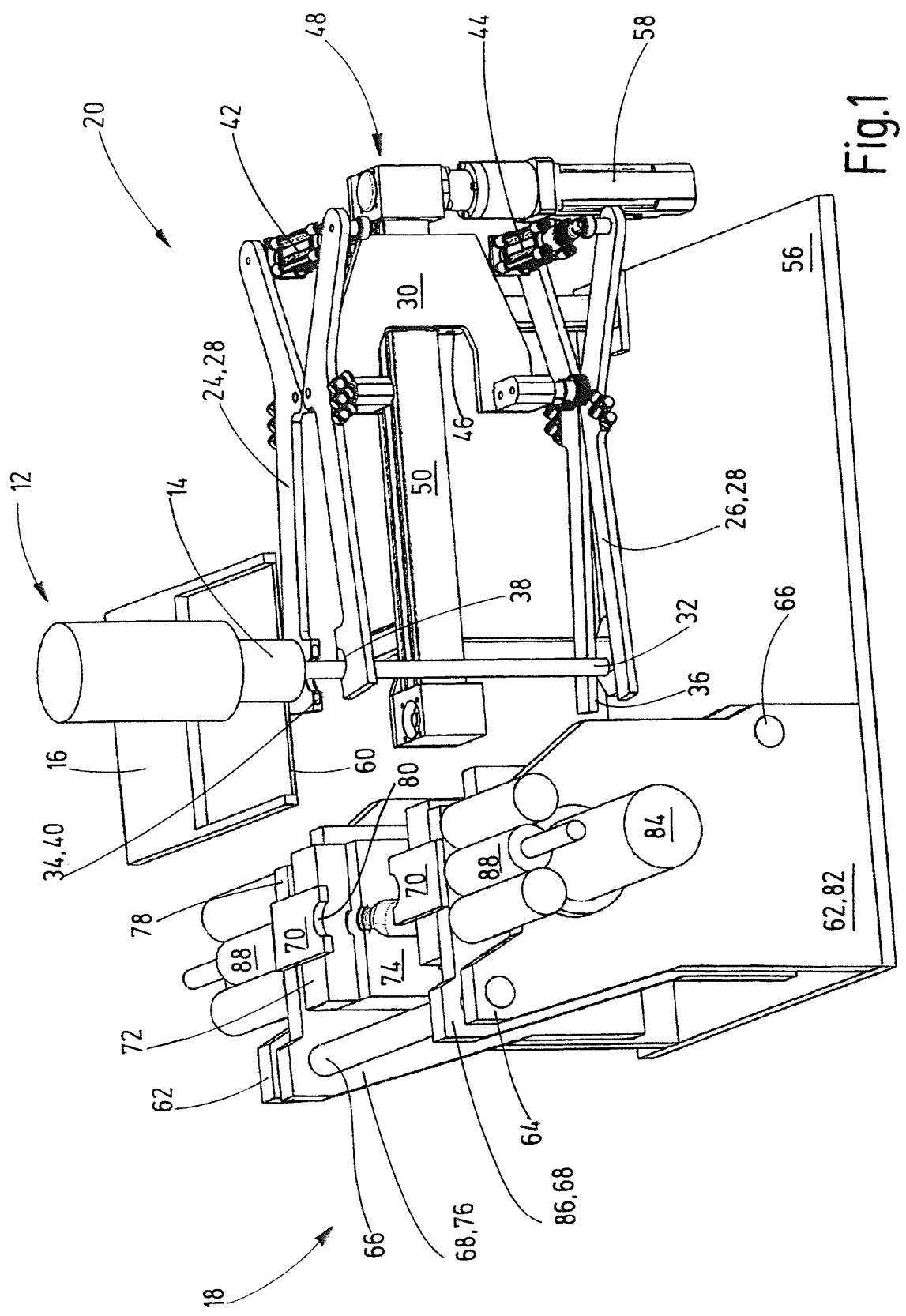
FIG. 1 is a perspective view of a device according to an exemplary embodiment of the invention, wherein a hose extruded by an extrusion device is arranged in a preforming position between one open pair of gripper jaws, each of two tongs of a gripper device.

FIG. 1 shows a device according to the invention for implementing a method according to the invention for producing at least one blow-molded, filled and sealed container product 10, in particular produced from at least one plastic material. The device has a stationary extrusion device or extruder 12 with a hose head 14, a movable cutting device 16, a stationary molding tool 18 that can be opened and closed and a movable gripper device or gripper20 for transporting a parison 22 that has been extruded by the hose head 14 and cut to length by the cutting device or cutter 16, from the extrusion device 12 to the molding tool 18.

In addition, the device has a support gas supply (not shown in the figures) directed into the interior of the hose 32, which support gas supply may be identical to the support gas supply disclosed in DE 102 45 318 A1. Optionally, the device may have a calibration element 51 for a sectionally calibration of the outer diameter of the heat-softened hose 32 in the preforming position.

The gripper device or gripper 20 has two tongs 24, 26, which, each extending in a horizontal plane, are aligned in parallel to each other, so that they are arranged congruently and superposed. Both tongs 24, 26 have a pair of angled legs 28 matching each other. The legs 28 of all tongs 24, 26 are arranged side by side and articulated mirror-symmetrically at the free ends of a U-shaped connecting plate 30 extending vertically between the tongs 24, 26. The connecting plate 30 keeps the tongs 24, 26 at such a distance from one another that the tongs 24, 26 can each hold a hose 32 extruded by the hose head 14 of the extrusion device 12 at its two end areas. For this purpose, all tongs 24, 26 have a pair of gripping jaws 34, 36 at their ends facing the molding tool 18.

The gripping jaws 34 of the first tongs 24, which are closest to the hose head 14, each have a semicircular recess 38 on their opposite sides, such that the two closed gripping jaws 34 of the first tongs 24 in conjunction form a circular recess as a receiving opening, whose diameter is slightly larger than the diameter of the extruded hose 32. One slot 40 is made in each of the gripping jaws 34 of the first tongs 24, starting from their mutually opposite inner sides, which slot 40 is connected to a vacuum pump (not shown in the figures) via a channel extending through the respective leg 28, for the purpose of generating a vacuum for holding the hose 32 circumferentially at its upper end area nearest the extrusion device 12 by suctioning the hose 32 using the two gripping jaws 34 of the first tongs 24. The gripping jaws 36 of the second tongs 26 are formed without recesses, so that they lie flat against each other in the closed state, forming a clamping gap. As a result, the second tongs 26 can hermetically seal and hold the still heat-softened extruded hose 32 at its end area furthest from the extrusion device 12. A drive 42, 44 each is arranged between the legs 28 of all tongs 24, 26 in their lower end area furthest from the molding tool 18, which drive 42, 44 is hinged at the end to both legs 28 for the purpose of synchronous, simultaneous actuation of the respective tongs 24, 26.

A temperature-control (not shown in the figures) may be provided, which has a cooling circuit that cools the gripper jaws 34, 36 of the respective tongs 24, 26 for the purpose of preventing unwanted sticking of the hose 32 or parison 22 to the gripper jaws 34, 36 of the respective tongs 24, 26. For gripping several hoses 32 arranged side by side in a row, the respective tongs 24, 26 can be designed as angular grippers in the form of a parallel gripper (not shown) as an alternative to the present design. The first tongs 24 may also be multi-part in that their gripping jaws 34 are interchangeable for the purpose of adapting the receiving opening 38 of the first tongs 24 to a predetermined hose diameter.

On one side at its central area, the U-shaped connecting plate 30 is firmly connected to a carriage 46, which can be moved on a rail 50 by a linear drive 48. The end areas of the rail 50 are supported on a rectangular base plate 56 of the device by respective foot parts 52, 54, and the rail 50 extends in parallel to the base plate 56 aligned in the longitudinal direction of the base plate 56 and the tongs 24, 26, which are also aligned in parallel to the base plate 56. Both foot parts 52, 54 are each formed as L-shaped angles and are firmly connected to the rail 50 at a distance from each other on the side facing away from the hose head 14. A drive 58 of the linear actuator 48 engages with the end of the rail 50 facing away from the hose head 14 of the extrusion device 12 and simultaneously protrudes longitudinally along the base plate 56 beyond the base plate 56, and extends vertically therefrom away from the rail 50 towards the base plate 56.

Figure 2:
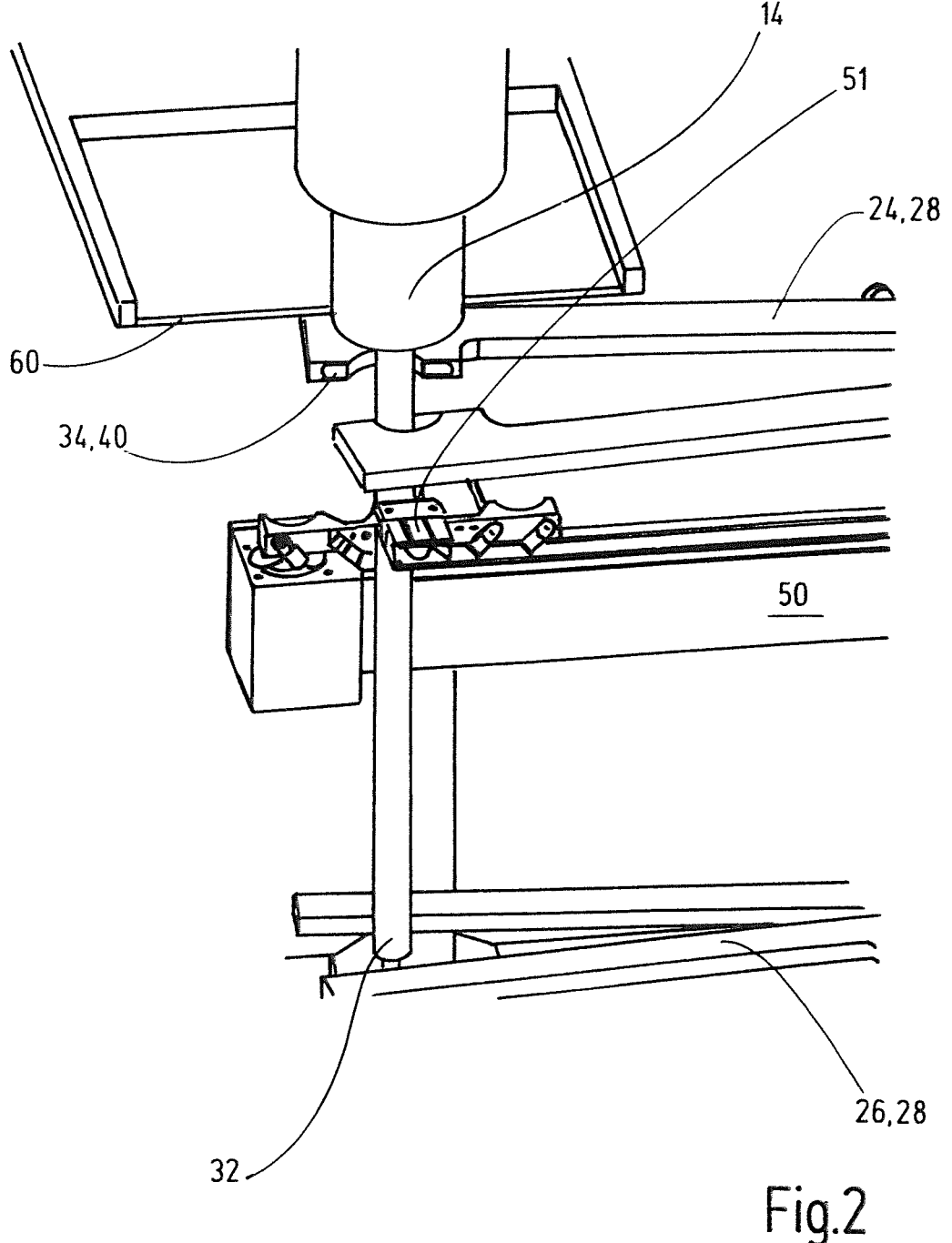
FIG. 2 is an enlarged partial perspective view of the device of FIG. 1 in the area of the pairs of gripper jaws of the tongs, wherein an open calibration element is provided between the tongs.
Figure 3:
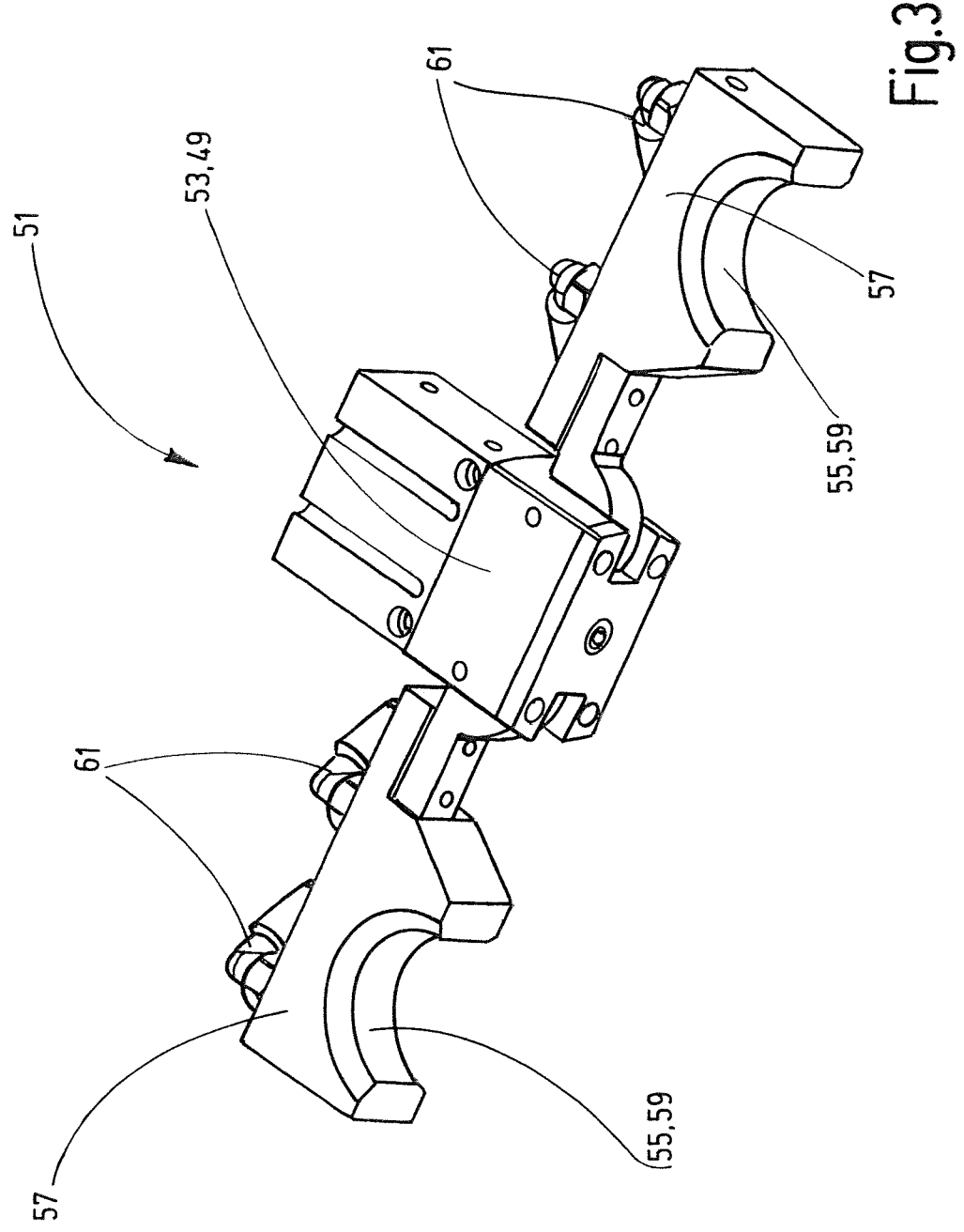
FIG. 3 is a perspective view of the open calibration element of FIG. 2.

Advantageously, a calibration by sections of the outer diameter of the heat-softened hose 32 can be performed in the preforming position. For this purpose, a calibration element or calibrator 51 (FIGS. 2 and 3), preferably stationary, is provided, which has a largely rectangular base part 49 and two calibration jaws 57. The calibration element 51 can be used to delimit the outer diameter of that part of the hose, which is enclosed by the calibration jaws 57 of the closed calibration element 51. The mount of the calibration element 51 is not shown in the figures.

One calibration jaw 57 each is articulated to the end areas of the two side surfaces of the base part 49 extending in the longitudinal direction of the base part, with one degree of freedom, such that the calibration jaws 57 can be moved between an open position, in which they extend perpendicularly away from the side surfaces of the base part 49, and a closed position, in which the calibration jaws 57 extend away from the free end face of the base part 49 and are in contact with each other. The base part 49 includes a drive 53 for moving the calibration jaws 57 from the open position to the closed position and vice versa. A semicircular recess 59 each is formed in the one side surfaces of the calibration jaws 57 facing each other in the closed position of the calibration jaws 57, which semicircular recesses 59 in conjunction form a circular receiving opening 55 for the hose 32 in the closed position of the calibration jaws 57. Preferably, the diameter of the receiving opening 55 is matched to the size of the neck of the container product 10 to be manufactured.

The other side surface, opposite from the one side surface with the recess 59, of the respective calibration jaw 57 is flat and preferably has two ports 61 for a temperature control (not shown in the figures). The temperature control is used to cool the calibration jaws 57 to locally selectively cool the hose 32 and, if necessary, prevent undesirable sticking of the heat-softened hose 32 to the calibration jaws 57.

The cutting device or cutter 16 is provided in the form of a cutting blade, which is aligned in parallel to the base plate 56 and the cutting edge 60 of which can be moved back and forth between the hose head 14 and the gripper device 20 transverse to the rail 50 and to the base plate 56 for separating the parison 22 from the hose 32 extruded by the hose head 14, between the hose head 14 of the extrusion device 12 and, in particular the gripper jaws 34 of the first tongs 24, of the gripper device 20. The cutting blade can, for instance, have the form of a hot knife or oscillate at an ultrasonic frequency. Such designs of the cutting blade 60 are known from the prior art, for which reason the respective design will not be discussed in more detail here.

Two stationary housing plates 62, aligned in parallel to each other and aligned longitudinally with respect to the base plate 56 and extending away from the base plate 56 in the direction of the hose head 14, are arranged at the end area, facing away from the drive 58 of the linear actuator 48, of the base plate 56. An extension 64 extending away from the base plate 56, is provided at the edge area, facing away from the drive 58 of the linear actuator 48 and from the base plate 56 of every housing plate 62. In the area of the extension 64 of the housing plates 62 and in an edge area, facing the drive 58 of the linear actuator 48 and the base plate 56 of the housing plates 62, a guide pin 66 extends between each of these housing plates 62 and is secured to each housing plate 62 at its two ends.

Two support plates 68, through which the guide pins 66 pass and which are guided for motion along the guide pins 66, are arranged between the housing plates 62 as tool carriers. The support plates 68 support the molding tool 18, which has one pair of holding 70, head 72 and forming jaws 74 each. Specifically, each support plate 68 bears a holding jaw 70, a head jaw 72, and a forming jaw 74 extending in pairs opposite from each other away from the facing sides 76 of the support plates 68 to each other. The respective holding jaw 70 is secured in the central area of the side 78, facing away from the base plate 56 of the support plates 68. A part-circular recess 80 for holding the parison 22 is provided in each of the sides, facing each other, of the holding jaws 70. First the head jaw 72 and then the forming jaw 74 adjoin the respective holding jaw 70 at the side 76 of every support plate 68 facing the other support plate 68, in the direction of the base plate 56.

In the edge area facing away from the base plate 56 and, viewed in the longitudinal direction, in the central area of the respective housing plate 62, one support plate drive 84 each is secured at the sides 82 facing away from each other, of the housing plates 62, which support plate drive 84 acts in a pressing or pulling manner on the support plate 68 adjacent to the respective housing plate 62, such that the support plates 68 can be moved towards each other by the support plate drive 84 to close the molding tool 18 and away from one another to open the molding tool 18. In an area of the support plates 68 projecting, with the exception of the extension 64, beyond the housing plates 62 in a direction away from the base plate 56, a respective head jaw drive 88 is secured at the sides 86, facing away from each other, of the support plates 68, which head jaw drive 88 acts in a pressing or pulling manner on the respective adjacent head jaw 72, such that the head jaws 72 can be moved towards and away from each other independently of the holding 70 and forming jaws 74. The direction of travel of the support plates 68 is aligned transversely to the direction of travel of the gripper device 20.

The linear drive 48 can move the two tongs 24, 26 simultaneously from a preforming position, the position where the tongs 24, 26 take over the extruded hose 32, to a transfer position, where the parison 22 is transferred into the opened molding tool 18, and vice versa.

Cooling, heating, shielding and/or reflecting devices (not shown in the figures) may be provided along the travel path of the parison 22 for optionally controlling the temperature of all or part of the parison 22, wherein a temperature sensor may be used to monitor the temperature of the hose 32 or parison 22. The respective cooling device can be designed such that a cooling fluid, preferably gas, in particular air, is directed against the parison 22. For cooling the parison 22, the transport path of the parison 22 can be extended and/or the transport speed can be adjusted in accordance with the required cooling capacity, achieving natural cooling by radiation. The respective heating device can be designed as a radiation heating device, preferably based on infrared radiation. By heating different areas of the hose 32, different wall thicknesses of the finished container product can be implemented. The shielding and reflecting devices (not shown) can each be formed as metal sheets.

Sensors, in particular optical sensors (not shown in the figures) can also be provided on the gripper device 20 or along the travel path of the parison 22 for checking the parison 22, for instance with regard to its geometry, its dimensions, its transparency, its wall thickness distribution, its temperature (distribution), its degree of crystallinity and its weight, for impurities and/or for particle inclusions, wherein the measured values of the respective sensor can be incorporated into a corresponding control of the extrusion process.

Protection devices (not shown in the figures) may be provided to protect the parison 22 during transport. For instance, a protection device to protect against contamination, in particular microbial and/or particulate contamination, can be designed in such a way that it directs a flow of clean, sterile air, i.e. low in particles and germs, and/or filtered air or inert gas towards the inner and/or outer surface(s) 90 of the parison 22 during the traversing motion of the parison 22.

Treatment devices not shown in the figures, can be provided along the travel path of the parison 22 for improving its properties, in particular for the selective modification of its surfaces 90, which treatment devices are used to treat the inside and/or outside surfaces 90 of the parison 22 using a fluid. The treatment device can be set up in such a way that it directs a flow of fluid towards the parison 22. The use of a reactive fluid, such as a fluorine-containing gas, permits the selective modification of the inner and/or outer surfaces 90 of the parison 22, resulting in an improvement in the barrier properties of the polymer used to produce the parison 22. When surface 90 is treated with gas mixtures containing siloxane, such as hexamethyldisiloxane (HMDSO) or 1, 1, 1, 3, 3, 3-hexamethyldisilazane (HMDS), inerting occurs and wetting properties are altered. Surface modifications have been shown to occur at parison 22 temperatures in the range of 150 to 250° C., depending on the polymer, without the need for additional measures typical of coatings, such as heating or plasma treatment.

The method according to the invention is explained in more detail below:

First, the hose head 14 of the usual extrusion device is used to extrude 12 the hose 32 in the vertical extrusion direction (z-direction), resulting in the former being arranged in a preforming position (FIG. 1). At the same time, the tongs 24, 26 are open.

Figure 5:
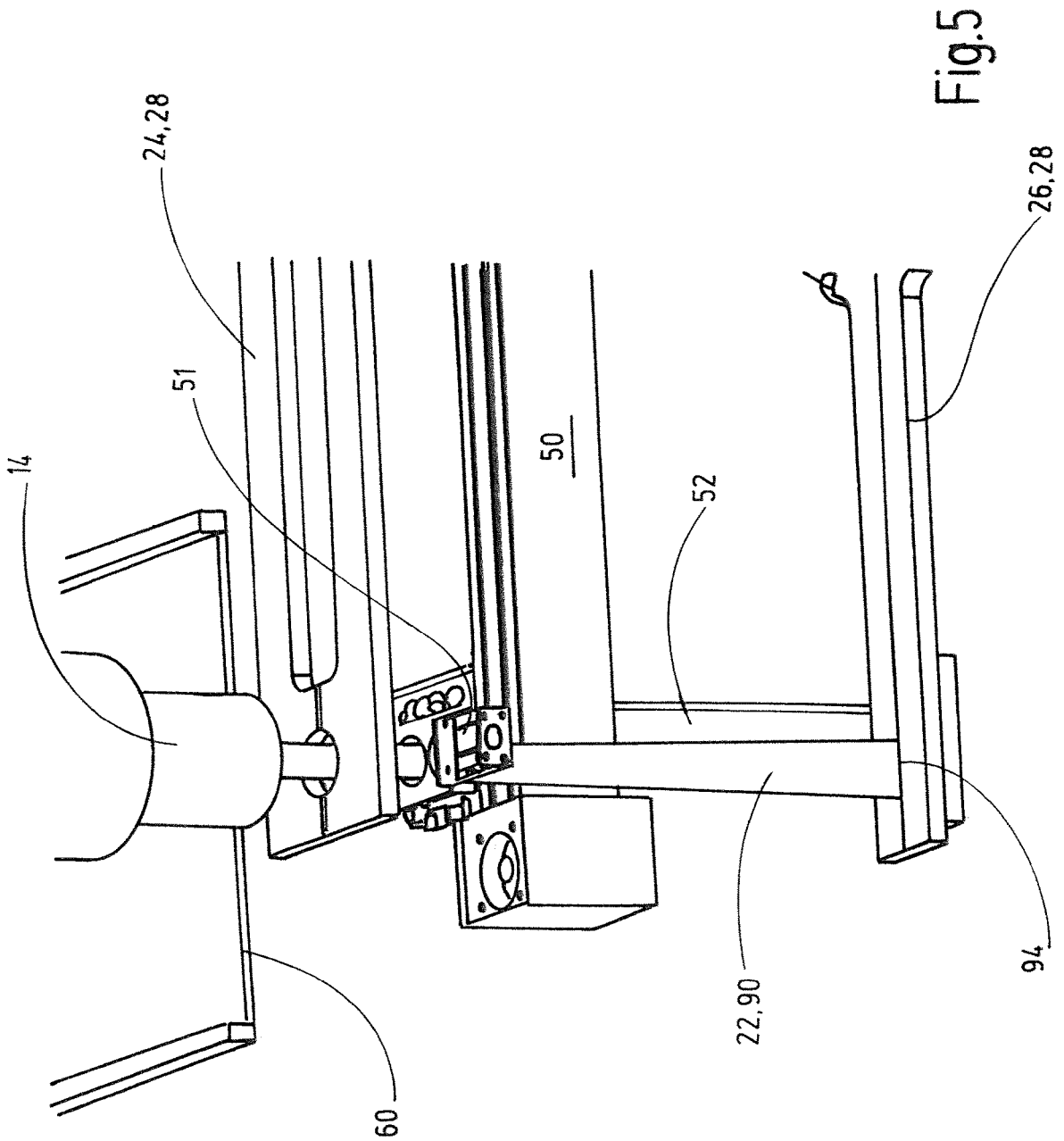
FIG. 5 is a perspective view of the device of FIG. 2, wherein the closed calibrating element and the upper pair of gripper jaws encompass the hose spaced apart.
Figure 6:
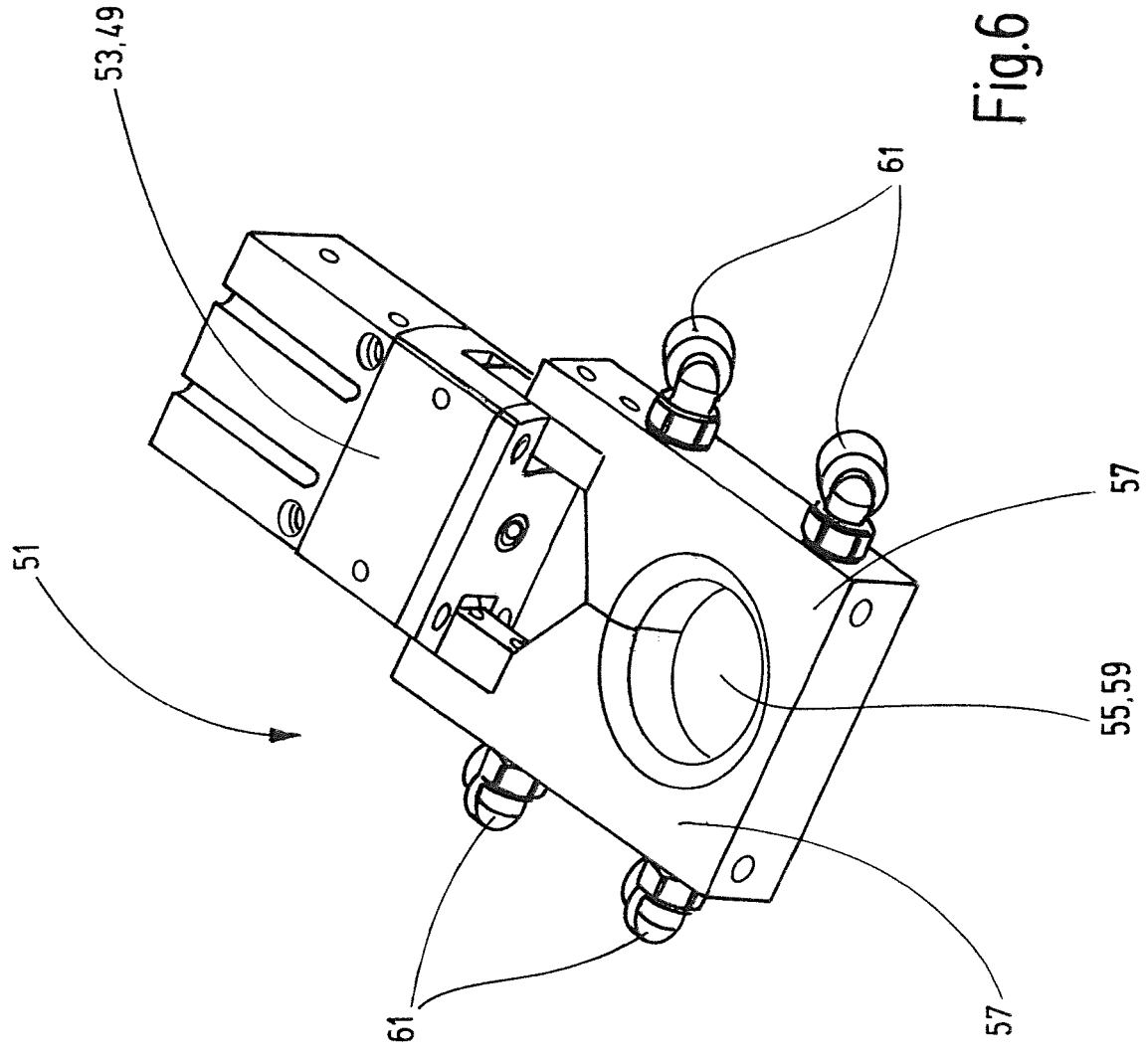
FIG. 6 is a perspective view of the calibration element of FIG. 3 in a closed state.
Figure 7:
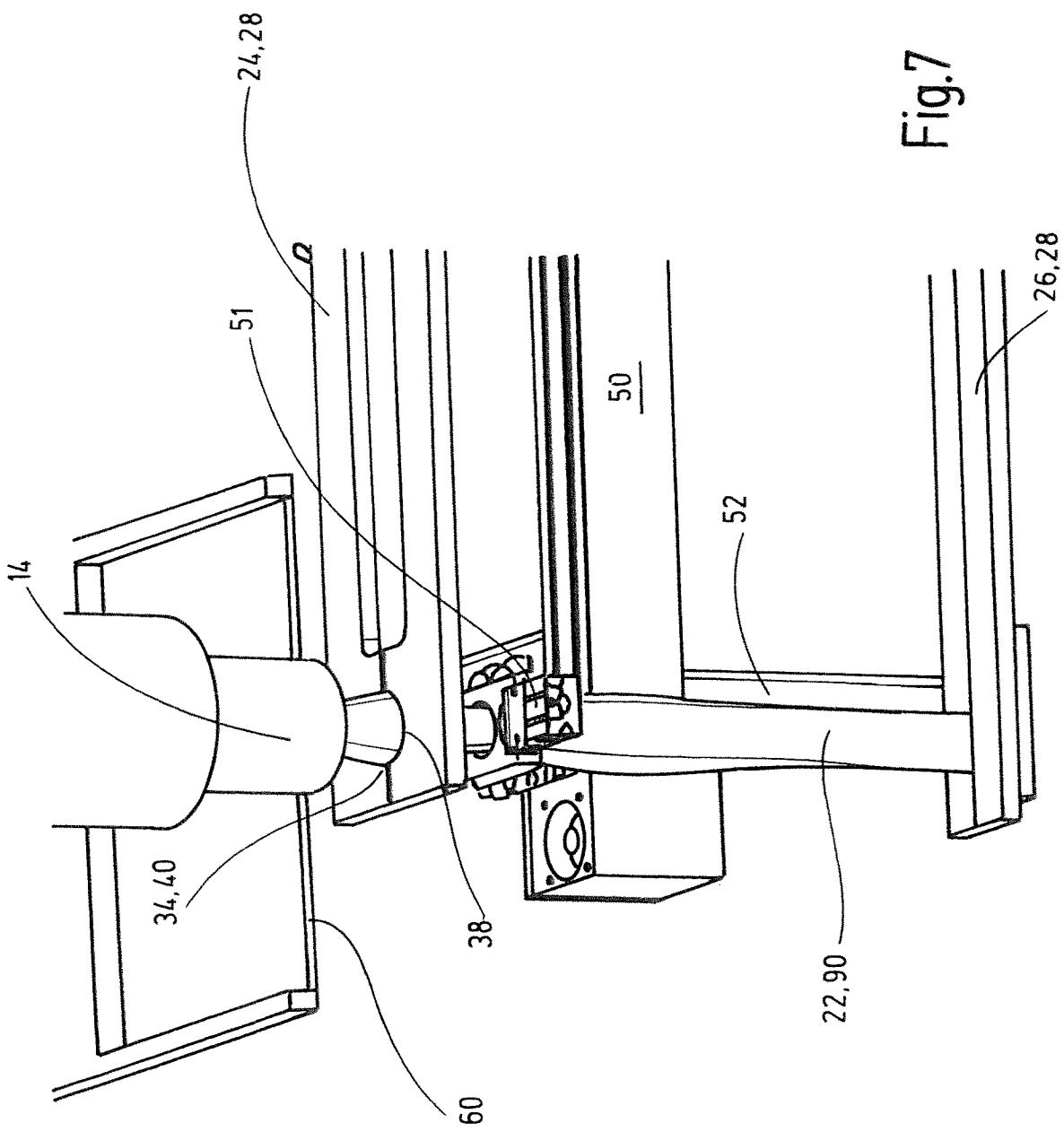
FIG. 7 is a perspective view of the device of FIG. 5, wherein the calibrating element and the upper pair of tongs enclose the hose tightly.

If possibly the stationary calibration element 51 (FIGS. 2, 5) is provided for a calibration by sections of the outer diameter of the heat-softened hose 32 in the preforming position, the calibration element's calibration jaws 57, which are also open, are first closed in a spaced-apart, encompassing manner around the hose 32 (FIG. 7). The supporting gas pulse directed into the interior of the hose 32 causes the hose 32 to contact the two calibration jaws 57 of the calibration element 51, and thus, determines the outer diameter of the heat-softened hose 32 in the contact area.

Figure 4:
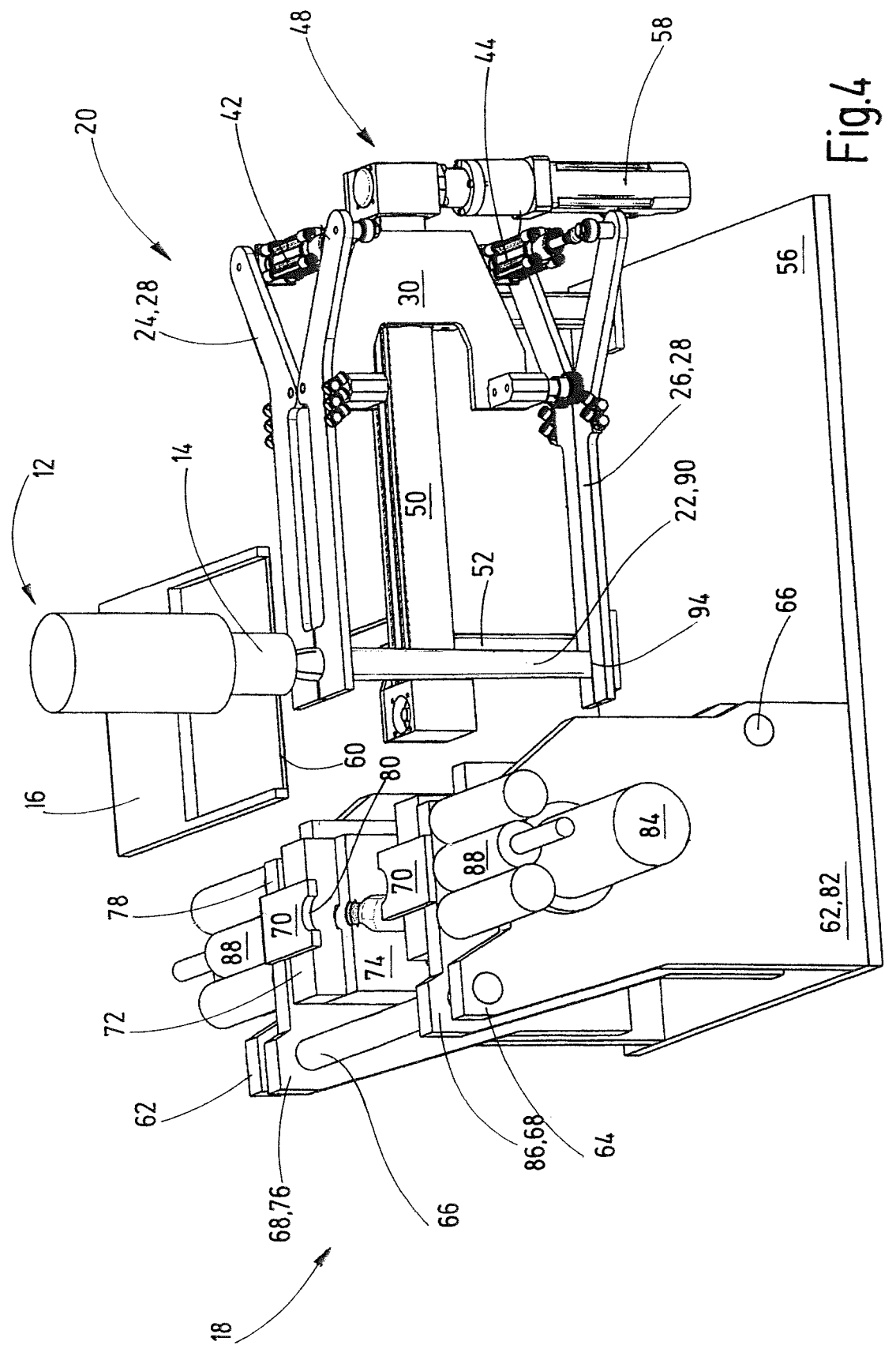
FIG. 4 is a perspective view of the device of FIG. 1, wherein the pairs of gripper jaws of the tongs are closed and the upper pair of gripper jaws enclose the hose tightly.
Figure 10:
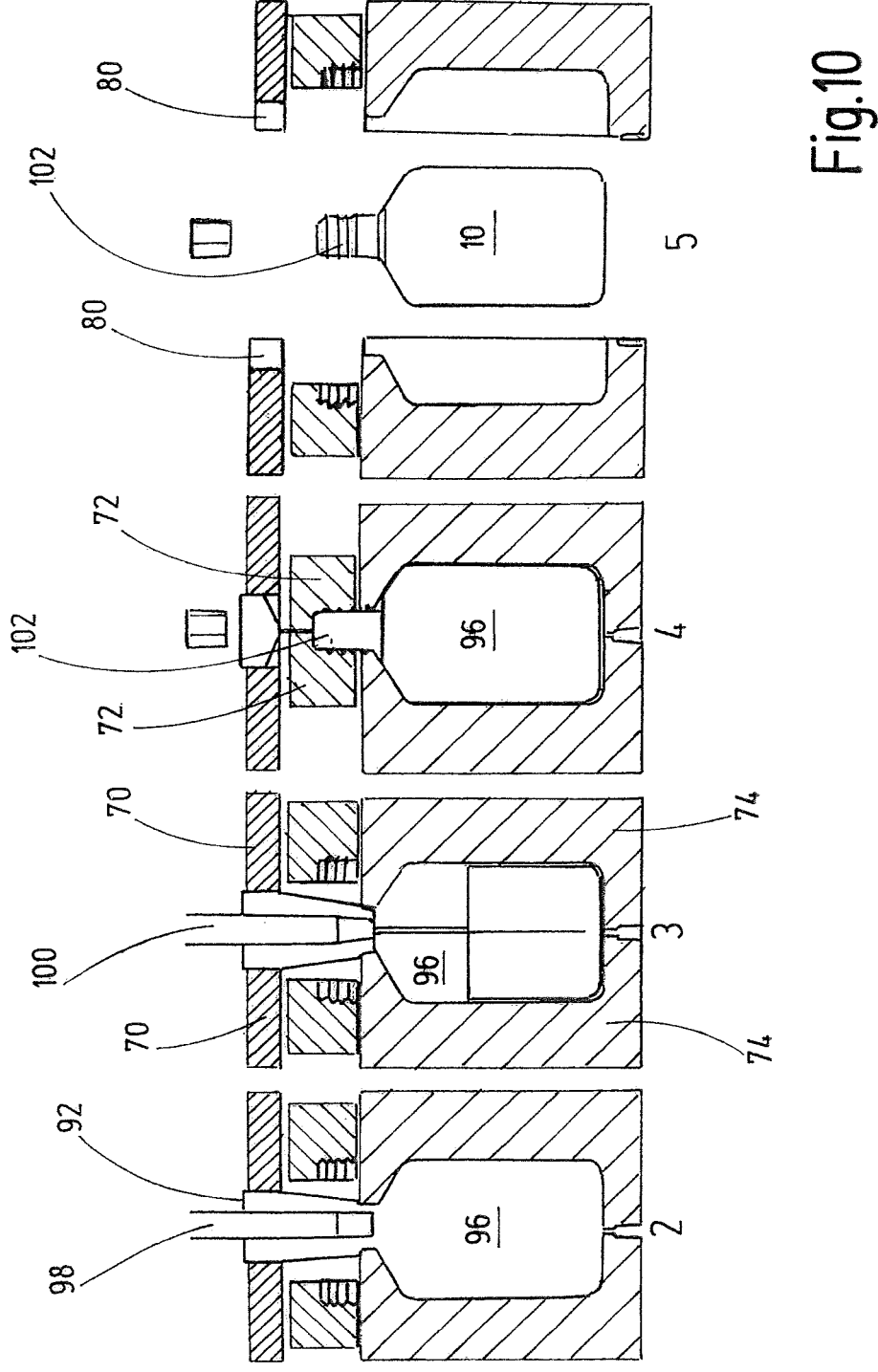
FIG. 10 are side views partly in section of the individual steps of a blow-molding, filling and sealing process according to an exemplary embodiment of the invention.

Thereafter or simultaneously, the respective tongs drive 42, 44 is used to close the tongs (FIG. 4, 7). In this way, the lower tongs 26 seal the hose 32 and hold it at its lower end area, whereas the gripping jaws 34 of the closed upper tongs 24 only surround the heat-softened hose 32 at its upper end area in an encompassing manner, but do not touch it. The supporting gas pulse or a further supporting gas pulse now expands the hose 32 in the area of the upper tongs 24, puts it against the gripper jaws 34 and holds it at the slots 40 by negative pressure. The vacuum is generated by a vacuum pump (not shown in the figures), which is connected by a channel (not shown) extending through the respective leg 28. Surprisingly, this structure permits keeping even large openings 92 (FIG. 10) with a diameter of up to about 6 cm open in a stable manner, allowing for a fast and thus cost-efficient filling using a correspondingly large filling mandrel 100 (FIG. 10).

If the calibration element 51 is provided, the calibration jaws 57 of the calibration element 51 are opened by the pneumatic actuator 53 after the hose 32 is in contact with the gripping jaws 34 of the first tongs 24. Thus, by the calibration element 51, the forming operation is performed in two distinct, regarding time and location, steps. In a first step, the calibrating element 51 shapes the hose 32 in the preforming position before it is cut off and, in a second step, after the parison 22 has been introduced into the actual molding tool 18 in the transfer position. Furthermore, according to the invention, the calibration element 51 manages to cool the hose 32 in the contact area of the calibration jaws 57, which are cooled by f the temperature control and in this way to specifically stabilize the shape of the hose 32.

Subsequently, the hose 32 is severed between the hose head 14 and the gripper device 20 to form an opening 92 at its upper end, thereby cutting the parison 22 off from the hose 32.

Figure 8:
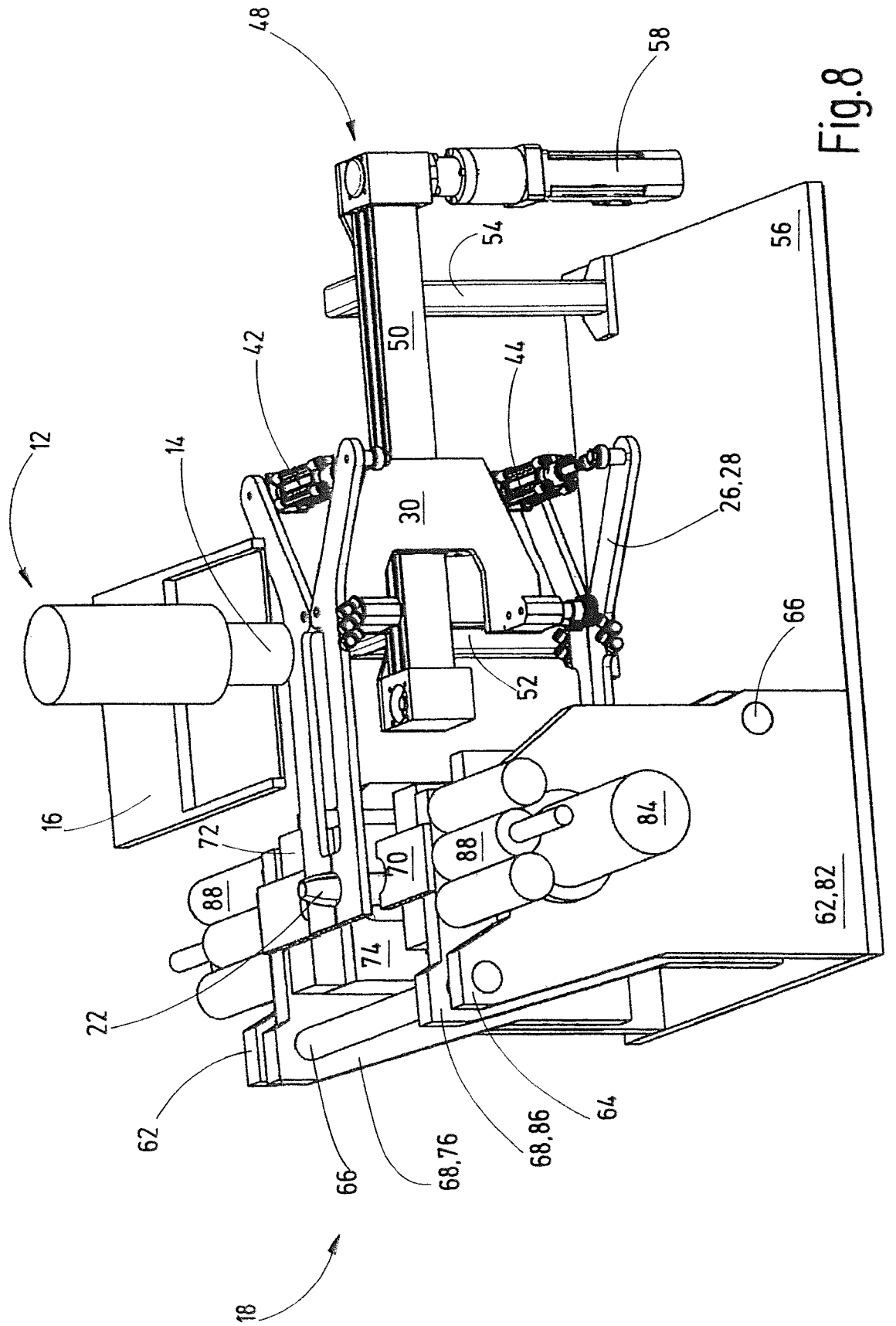
FIG. 8 is a perspective view of the device of FIG. 1, wherein a parison is arranged between opened holding, head and forming jaws of a molding tool while being held in a main forming position by the gripper device.

Then, the gripper device 20, which holds the parison 22 open on one side in a vertical orientation, transports the parison 22 by the linear drive 48 starting from the preforming position in a linear transport direction along the rail 50 of the linear drive 48 into the opened molding tool 18, in which the parison 22 is arranged in a main molding position (FIG. 8).

Optionally, this motion first is downwards in the vertical direction (z-direction) and then transversely to the stationary mold in the transfer position.

Figure 9:
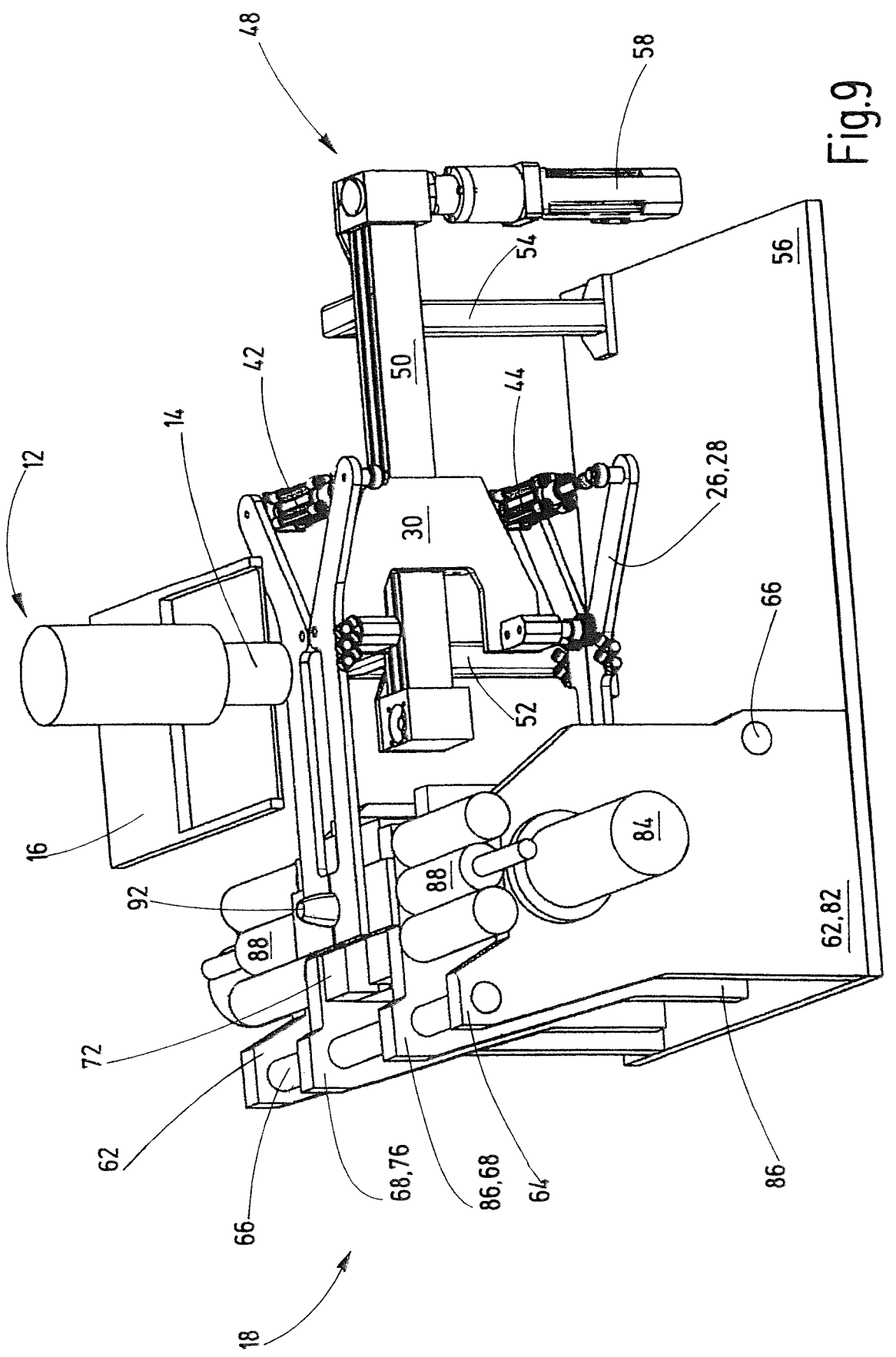
FIG. 9 is a perspective view of the device of FIG. 8, wherein the holding, head and forming jaws are closed.

First, the lower tongs 26 are opened and the support plate drive 84 is used to close the support plates 68, in particular the head jaws 72 are carried along by the support plates 68 and the holding 70 and forming jaws 74 are closed for the holding 70 and forming jaws 74 to hold the parison 22 therebetween (FIG. 9). In this process, the forming jaws 74 weld the underside 94 of the parison 22 shut. Thereafter, opening of the upper tongs 24 completes the transfer of the parison 22 from the gripper device 20 to the molding tool 18. The largely freely accessible arrangement of the parison 22 during the traversing motion makes it accessible for further method steps.

Subsequently, a usual blow molding, filling and sealing process is performed on the parison 22. Thus, the forming jaws 72 are used to first blow mold the container body 96 of the container product 10 using a blow molding assembly 98 (FIG. 10—step 2). Subsequently, a filling device 100 (FIG. 10—step 3) fills the container body 96 with filling material via the opening 92 of the container body. Then, the respective head jaw drive 88 is used to close the head jaws 72 of the molding tool 18, thereby forming a head part 102 of the filled container product 10, namely the head part 102 is sealed towards the outside (FIG. 10—step 4). Because every head jaw 72 can be closed by a head jaw drive 88 in the form of a hydraulic cylinder and each mold jaw 74 can be closed by f a support plate drive 84 in the form of a further hydraulic cylinder, the blow molding and filling process can be performed at a particularly high pressure.

Afterwards, the gripper device 20 is transported back along the rail 50 into the extrusion position and simultaneously opened for a renewed sequence of the preceding method steps. Finally, the forming 74, head 72 and holding jaws 70 (FIG. 10—step 5) are retracted, thereby removing the finished container product 10 from the molding tool 18. This step can also be performed using an additional manipulator, such as a robotic arm.

Optionally, it is possible—as detailed in DE 10 2014 008 611 A1—to introduce an insert into the upper part of the container product 10 between filling (FIG. 10, step 3) and sealing of the container product 10 (FIG. 10, step 4).

Optionally and simplifying, it is further possible to make one of the forming jaws 74 stationary by securing it to the base plate 56 and moving only the other forming jaw 74, thereby minimizing the number of support plate drives 84. Such a one-sided closing motion requires that the parison is always located in the center between the two forming jaws 74, which is made possible by a transverse motion of the gripper device 20 that is easy to implement.

Optionally, and in a considerably simplifying manner, the holding jaws 70 as part of the molding tool 18 can also be dispensed with, and the upper tongs 24 of the gripper device 20 can take over a holding function, wherein the parison 22, even while it is already at least partially located in the molding tool 18, is held by the upper tongs 24 of the gripper device 20 by a pressure gradient at least until the start of its further forming, which is easy to implement in terms of control technology.

Further advantageously, the container product 10 can be removed towards the top, which according to the invention is rendered possible by the space above the mold being empty, i.e., it is not occupied by the hose head 14 of the extrusion device 12.

Advantageously, as already mentioned, the gripper device 20 and with it the parison 22 can initially be moved in the vertical direction (z-direction) after separation. This renders—while maintaining continuous extrusion of a hose 32—dispensing with the technically complex tilting motion of the extruder, which is customary in the prior art and results in a vertical motion of the hose head 14 possible. For this purpose, the parison 22 is moved downwards in the extrusion direction (z-direction) with the aid of the gripping assembly 20 after the parison 22 has been separated from the hose 32 and before it is transported transverse thereto to the main forming position.

The gripper device 20 according to the invention having its two tongs 24, 26, has proved to be very advantageous, particularly for transporting parisons of low weight. Whereas in the case of parisons 22 weighing more than approx. 0.1 kg during transport, holding them by only the upper tongs 24 is often sufficient for stable production processes resulting in low rejection numbers, in the case of lightweight parisons 22 for the production of lightweight containers weighing less than approx. 0.06 kg, and in the case of multiple hose heads using a plurality of tongs 24, 26 in accordance with the invention is advantageous for securing purposes.

The lightweight containers produced in this way-such as bottles or ampoules—can preferably be used for medical purposes, for instance for infusion solutions, inhalatives, ophthalmics, injectables or diagnostics and oral tonics.

While one embodiment has been chosen to illustrate the invention, it will be understood by those skilled in the art that various changes and modifications can be made therein without departing from the scope of the invention as defined in the claims.

The invention claimed is:

1. A method for producing a filled container, the method comprising method steps of:

extruding a hose by an extruder using supporting gas shaping the hose in a vertical extrusion direction in a preforming position;

sealing the hose at a lower end of the hose and cutting the hose off providing an upper open end of the hose and forming a parison of a selected length;

transporting the parison using a gripper in a linear transport direction transverse to the vertical extrusion direction from the preforming position into a molding tool when open;

transferring the parison into the molding tool when open using the gripper in a main forming position;

sealing the molding tool closed and molding the parison in the molding tool using a pressure gradient whereby an increased pressure is formed in the parison;

filling the parison with contents and sealing the parison forming the filled container; and returning the gripper to the preforming position for a repeated sequence of the method steps, wherein supporting gas pressure via a hose head of the extruder is used to put the hose against upper tongs of the gripper and to hold the hose at the upper open end thereof, after the hose is sealed at the lower end thereof.

2. The method according to claim 1, wherein a cutting device separates the parison from the hose between the hose head of the extruder and the gripper in the preforming position.

3. The method according to claim 1, wherein in the preforming position, the gripper is moved downward with the parison in the vertical extrusion direction, but the hose head of the extruder is not moved during continuous extrusion of the hose.

4. The method according to claim 1, wherein the parison is held in a substantially vertical, upwardly open orientation thereof in the preforming position and during transporting by the gripper.

5. A method for producing a filled container, the method comprising method steps of:

extruding a hose by an extruder using supporting gas shaping the hose in a vertical extrusion direction in a preforming position;

sealing the hose at a lower end of the hose and cutting the hose off providing an upper open end of the hose and forming a parison of a selected length;

transporting the parison using a gripper in a linear transport direction transverse to the vertical extrusion direction from the preforming position into a molding tool when open;

transferring the parison into the molding tool when open using the gripper in a main forming position;

sealing the molding tool closed and molding the parison in the molding tool using a pressure gradient whereby an increased pressure is formed in the parison;

filling the parison with contents and sealing the parison forming the filled container; and returning the gripper to the preforming position for a repeated sequence of the method steps, wherein:

the parison comprises at least one of semi-crystalline or amorphous polyolefin having a weight of less than 0.1 kg and an average wall thickness of less than 0.3 cm; and at a time of separation of the parison, the parison has an average temperature in a range of 150° C. to 210° C.

6. The method according to claim 5, wherein the weight is less than 0.07 kg.

7. The method according to claim 5, wherein the average wall thickness is less than 0.2 cm.

8. The method according to claim 5, wherein the parison, during transporting thereof from the preforming position to the main forming position, is held at least by two tongs of the gripper at least temporarily at two different points.

9. The method according to claim 5, wherein
the parison, during transporting thereof from the preforming position to the main forming position, is held at least by two tongs of the gripper at least temporarily at each end of the parison.

10. The method according to claim 5, wherein
the molding tool takes over support of the parison from the gripper by opposing holding jaws of the molding tool that close.

11. The method according to claim 5, wherein
upper tongs of the gripper hold the parison located at least partially in the molding tool at least until molding of the parison begins.

12. The method according to claim 5, wherein
the molding tool comprises first and second forming jaws and is closed around the parison by a unilateral motion of only the first forming jaw, while the second forming jaw is stationary.

13. The method according to claim 5, wherein
lower tongs of the gripper are used to seal the hose at the lower end thereof in the preforming position.

14. A method for producing a filled container, the method comprising method steps of:
extruding a hose by an extruder using supporting gas shaping the hose in a vertical extrusion direction in a preforming position;
sealing the hose at a lower end of the hose and cutting the hose off providing an upper open end of the hose and forming a parison of a selected length;
transporting the parison using a gripper in a linear transport direction transverse to the vertical extrusion direction from the preforming position into a molding tool when open;
transferring the parison into the molding tool when open using the gripper in a main forming position;
sealing the molding tool closed and molding the parison in the molding tool using a pressure gradient whereby an increased pressure is formed in the parison;
filling the parison with contents and sealing the parison forming the filled container; and
returning the gripper to the preforming position for a repeated sequence of the method steps,
wherein, in addition to the molding of the parison in the molding tool at the main molding position, at least one further molding of the hose is performed outside the main molding position.

15. The method according to claim 14, wherein
the at least one further molding is tool-related.

16. The method according to claim 14, wherein
the at least one further molding of the parison is performed in the preforming position by putting at least a section of the hose against calibration jaws of a calibrator to delimit an outer diameter of the hose.

17. A method for producing a filled container, the method comprising method steps of:
extruding a hose by an extruder using supporting gas shaping the hose in a vertical extrusion direction in a preforming position;
sealing the hose at a lower end of the hose and cutting the hose off providing an upper open end of the hose and forming a parison of a selected length;
transporting the parison using a gripper in a linear transport direction transverse to the vertical extrusion direction from the preforming position into a molding tool when open;
transferring the parison into the molding tool when open using the gripper in a main forming position;

sealing the molding tool closed and molding the parison in the molding tool using a pressure gradient whereby an increased pressure is formed in the parison;
filling the parison with contents and sealing the parison forming the filled container; and
returning the gripper to the preforming position for a repeated sequence of the method steps,
wherein at least a part of the hose in the preforming position is put, by a short supporting gas pulse, almost simultaneously against calibration jaws of a calibrator and against upper tongs of the gripper.

18. A method for producing a filled container, the method comprising method steps of:
extruding a hose by an extruder using supporting gas shaping the hose in a vertical extrusion direction in a preforming position;
sealing the hose at a lower end of the hose and cutting the hose off providing an upper open end of the hose and forming a parison of a selected length;
transporting the parison using a gripper in a linear transport direction transverse to the vertical extrusion direction from the preforming position into a molding tool when open;
transferring the parison into the molding tool when open using the gripper in a main forming position;
sealing the molding tool closed and molding the parison in the molding tool using a pressure gradient whereby an increased pressure is formed in the parison;
filling the parison with contents and sealing the parison forming the filled container; and
returning the gripper to the preforming position for a repeated sequence of the method steps,
wherein, at least during transporting the parison between the preforming position and the main forming position, the parison is subjected to measurement determining at least one of dimensions of the parison, weight of the parison, temperature distribution of the parison, transparency of the parison, crystallinity of the parison or impurities of the parison.

19. The device according to claim 18, wherein
the gripper comprises upper and lower pairs of tongs that are axially spaced apart, the upper pair of tongs being capable of keeping open a receiving opening of an upper open end of the parison, and the lower pair of tongs being capable of sealing and holding the hose at the lower end thereof.

20. The device according to claim 19, further comprising
a linear drive being capable of jointly guiding the upper and lower pairs of tongs in a movable manner from the preforming position to a transfer position on the molding tool and back.

21. The device according to claim 18, wherein
the molding tool is movable only on one side and comprises one pair of forming jaws and head jaws and no holding jaws.

22. A method for producing a filled container, the method comprising method steps of:
extruding a hose by an extruder using supporting gas shaping the hose in a vertical extrusion direction in a preforming position;
sealing the hose at a lower end of the hose and cutting the hose off providing an upper open end of the hose and forming a parison of a selected length;
transporting the parison using a gripper in a linear transport direction transverse to the vertical extrusion direction from the preforming position into a molding tool when open;

transferring the parison into the molding tool when open using the gripper in a main forming position;

sealing the molding tool closed and molding the parison in the molding tool using a pressure gradient whereby an increased pressure is formed in the parison;

filling the parison with contents and sealing the parison forming the filled container; and returning the gripper to the preforming position for a repeated sequence of the method steps, wherein the filled container is a lightweight medical container having a volume of less than 2 liters and an empty weight of less than 0.06 kg.

23. A device for producing a filled container, the device comprising:

an extruder including a hose head having a supporting gas being capable of extruding and shaping a hose in a vertical extrusion direction in a preforming position;

a molding tool;

a sealer being capable of sealing the hose at a lower end of the hose and a cutter being capable of cutting the hose off providing an upper open end of the hose and forming a parison of a selected length; and a gripper being capable of moving the parison in a linear transport direction transverse to the vertical extrusion direction from the preforming position into the molding tool when open, wherein:

the gripper is capable of transferring the parison into the molding tool when open in a main forming position;

the molding tool is capable of: (i) being closed and molding the parison in the molding tool using a pressure gradient whereby an increased pressure is formed in the parison such that the parison is molded into a container being capable of being filled with contents; and (ii) sealing the container forming the filled container in the molding tool;

the gripper is capable of returning to the preforming position for a repeated sequence of the forming for another filled container;

the gripper comprises upper and lower pairs of tongs that are axially spaced apart, the upper pair of tongs being capable of keeping open a receiving opening of an upper open end of the parison, and the lower pair of tongs being capable of sealing and holding the hose at the lower end thereof; and the supporting gas is capable of shaping the hose against surfaces of at least one of the upper and lower pairs of tongs.

* * * * *